United States Patent [19]

Morita et al.

[11] Patent Number: 4,773,373
[45] Date of Patent: Sep. 27, 1988

[54] ENGINE CONTROL SYSTEM

[75] Inventors: Kiyomi Morita, Katsuta; Junji Miyake, Mito, both of Japan

[73] Assignee: Hitachi, Ltd., Tokyo, Japan

[21] Appl. No.: 927,138

[22] Filed: Nov. 5, 1986

[30] Foreign Application Priority Data

Nov. 5, 1985 [JP] Japan ................. 60-246356

[51] Int. Cl.[4] .................. F02P 5/15; F02D 41/02
[52] U.S. Cl. .................. 123/416; 123/488; 123/494
[58] Field of Search ............. 123/416, 417, 488, 494

[56] References Cited

U.S. PATENT DOCUMENTS

| 4,201,161 | 5/1980 | Sasayama et al. | 123/489 |
| 4,214,306 | 7/1980 | Kobayashi | 123/480 X |
| 4,284,045 | 8/1981 | Maier | 123/416 |
| 4,498,438 | 2/1985 | Sato | 123/416 X |
| 4,548,180 | 10/1985 | Yamato | 123/478 |
| 4,550,705 | 11/1985 | Nagano et al. | 123/488 |
| 4,637,362 | 1/1987 | Yasuoka et al. | 123/339 X |

FOREIGN PATENT DOCUMENTS

| 145993 | 6/1985 | European Pat. Off. . | |
| 10744 | 1/1984 | Japan | 123/494 |
| 63330 | 4/1984 | Japan . | |
| 3448 | 1/1985 | Japan | 123/494 |
| 69248 | 4/1985 | Japan . | |

Primary Examiner—Tony M. Argenbright
Attorney, Agent, or Firm—Antonelli, Terry & Wands

[57] ABSTRACT

An engine control system which controls ignition timing for, and fuel supply to, an engine by scanning a map by using as parameters a first item of data representing the number of revolutions of the engine and a second item of data representing engine load. The engine control system includes filter means for providing a third item of data by suppressing the rate of change of the second item of data. The third item of data is used in place of the second item of data for scanning the map only when the engine is in a predetermined range of operating conditions in which the rate of change of a manipulated variable of a throttle valve, the number of revolutions of the engine and the rate of change of the engine load are all less than respective predetermined values.

9 Claims, 5 Drawing Sheets

ENGINE CONTROL SYSTEM

BACKGROUND OF THE INVENTION

This invention relates to engine control systems of the type which obtains control data by performing map scanning in accordance with the number of revolutions of an engine and the load applied to the engine, and more particularly it is concerned with an engine control system of the type described which is suitable for controlling internal combustion engines, such as gasoline engines for automotive vehicles.

For internal combustion engines (hereinafter engines for short), such as gasoline engines for automotive vehicles, a control system generally referred to as an electronic control type engine control system is known, for example as disclosed in U.S. Pat. No. 4,201,161. This system is designed to monitor the number of revolutions of an engine and the load applied to the engine and scans a map by using the obtained data as parameters, so as to obtain control data on fuel supply and ignition timing that are necessary for controlling the performance of the engine.

The engine control system of the type in which a map is scanned as referred to hereinabove offers the advantage that it responds quickly to changes in engine operating conditions and is capable of admirably coping with a transient condition of the engine, so that engine control can be achieved satisfactorily. However, one problem encountered by this system is that, when the throttle valve is actuated and brought to a condition in which it is nearly fully open, a pulsation appears in the engine torque, with a result that surging occurs in engine speed and spoils riding comfort.

SUMMARY OF THE INVENTION

This invention has been developed for the purpose of obviating the aforesaid problem of the prior art. Accordingly, the invention has as its object the provision of an engine control system which is capable of suppressing a pulsation in torque while providing the advantage offered by the system relying on map scanning so that the system responds quickly to changes in engine operating conditions.

To accomplish the aforesaid object, the invention provides means for suppressing the rate of change of data representing a load applied to the engine, so as to obtain, only when the engine is in a predetermined range of operating conditions, at least one coefficient of correction by performing map scanning by using data whose rate of change is suppressed.

DESCRIPTION OF THE PREFERRED EMBODIMENT

Figure 2:
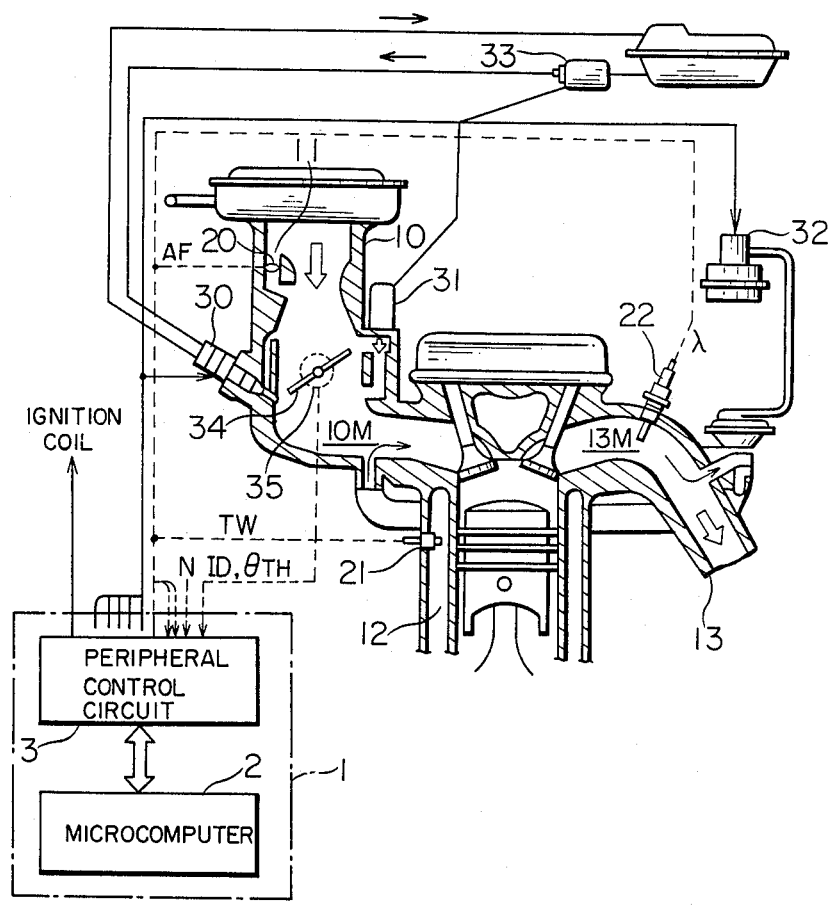
FIG. 2 is a view of one example of an engines equipped with an electronic engine control system which relies on map scanning.
Figure 3:
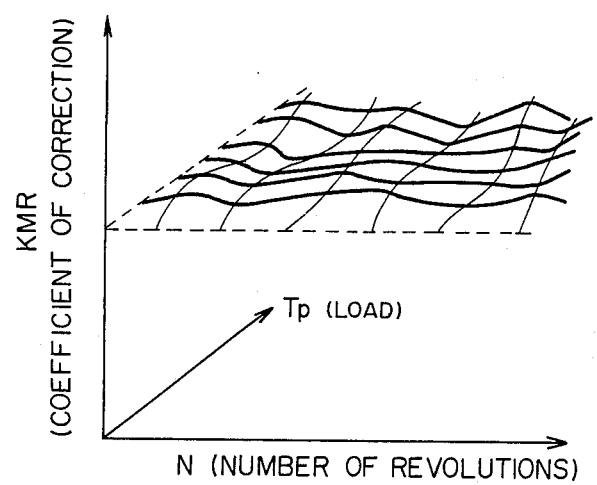
FIG. 3 is a view in explanation of a map used in the prior art.

Before describing a preferred embodiment of the invention, one example of the engine control system of the electronic control type of the prior art will be outlined by referring to FIGS. 2-5. Referring to FIG. 2, an engine control system 1 comprises a microcomputer 2 and a peripheral control circuit 3. Air flow data AF from an air flow sensor which is in the form of a hot wire 20 mounted in a bypass passageway 11 in a suction conduit 10 of the engine, water temperature data WT from a water temperature sensor 21 mounted in an engine cooling water channel 12, air-fuel ratio data λ from an air-fuel ratio sensor 22 mounted in an exhaust pipe 13 of the engine and engine number-of-revolutions data N from a number-of-revolutions sensor, not shown, are fed into the control system 1 which does calculation on the data thus supplied, to provide control signals to a fuel injection valve 30, a bypass valve 31, an exhaust gas recirculation (EGR) control valve 32, a fuel pump 33 and an ignition coil, not shown, so that fuel supply, the number of revolutions for idling and EGR can be regulated by controlling the fuel injection valve 30, bypass valve 31 and EGR control valve 32, respectively. Moreover, ignition control is effected by controlling the initiation and interruption of a current supply to the ignition coil. Meanwhile the fuel pump 33 is controlled such that it is operated only when the engine key switch is in a starting position and the engine is rotating by its own power.

A throttle valve 34 is provided with a throttle sensor (or a throttle switch) 35, so that opening data $Q_{TH}$ for the throttle valve 34, or a signal which is turned on when the throttle valve 34 is brought to an idling condition, or when the throttle valve 34 is restored to its original position after the acceleration pedal is released, is inputted to the microcomputer 2.

In FIG. 2, the fuel injection valve 30 is located downstream of the throttle valve 34 with respect to the direction of flow of air through valve 34 with respect to the direction of flow of air through the suction passageway. It is well known, however, that the fuel injection valve 30 may be mounted upstream of the throttle valve 34.

Although not clearly shown in FIG. 2, many engines for which the control system shown is used are what are generally referred to as multicylinder engines provided with a plurality of cylinders. Thus a manifold 10M is located at the downstream end of the suction conduit 10, and another manifold 13M is located at the upstream end of the exhaust pipe 13.

Operation of the control system of the prior art constructed as described hereinabove is as follows.

The microcomputer 2 processes the air flow data from the air flow sensor 20 and does calculation on an air intake $Q_A$ per unit of time, and does calculation on a fuel supply $F_i$ per unit time by the following equation based on air intake $Q_A$ per unit time and data N representing the number of revolutions of the engine:

$$F_i = \frac{Q_A}{N} + K \qquad (1)$$

where K: one of various coefficients of correction.

Meanwhile the amount of fuel injected by the fuel injection valve 30 per unit of time is fixed, and in this type of system, what is generally referred to as intermittent fuel supply control is effected by setting a fuel injection cycle synchronous with the rotation of the engine, so as to inject fuel for a predetermined time in each injection cycle. Thus the fuel supply $F_i$ of equation (1) can be determined by the injection time $T_i$ for each injection cycle of the fuel injection valve 30. Therefore, equation (1) can be rewritten as follows:

$$T_i = K_i \cdot F_i = K_i \cdot \frac{Q_A}{N} + K \qquad (2)$$

where $K_i$: the coefficient determined by the fuel injection valve 30.

Thus the control system 1 effects control in such a manner that calculation is done by equation (2) in a predetermined cycle or cyclically every 10 mS, for example, or at a predetermined number of revolutions in synchronism with the rotation of the engine to obtain new injection times $T_i$ successively to actuate the fuel injection valve 30 and open same, to provide a predetermined air-fuel ratio. In the foregoing description, the coefficients of correction are described as being represented by K. In actual practice, however, various corrections need be made in accordance with the operating conditions of the engine, and the coefficients of correction should be expressed as $K = (K_1, K_2, \ldots K_n)$.

Thus, for practical purposes, a quantity $T_p$ is set by eliminating the coefficient of correction K from equation (2) and used as a basic amount of injected fuel.

$$T_p = K_i \frac{Q_A}{N} \qquad (3)$$

It is therefore usual practice to effect engine control by providing the basic amount of injected fuel $T_p$ with various types of correction. In this electronic engine control system of the prior art, it has hitherto been customary to use, as a coefficient of correction K, a coefficient of correction KMR (KMR=$f_{(T_p N)}$) which is obtained by performing the scanning of a memory map (a memory from which the stored data is read out by using two parameters) shown in FIG. 3 by using the basic amount of injected fuel $T_p$ and the number of revolutions N of the engine. At this time, the basic amount of the injected fuel $T_p$ represents the magnitude of a load applied to the engine, so that it will henceforth be referred to as an engine load $T_p$.

The same also applies to the ignition timing control referred to hereinabove. That is, the ignition timing is corrected by examining a map by using the engine load $T_p$ and the number of revolutions N. The map used is similar to that shown in FIG. 3 and has written thereto beforehand optimum corrections for ignition timing corresponding to the engine load $T_p$ and the number of revolutions N which are read out to provide a coefficient of correction KMR.

The engine control system in which a map is scanned as described hereinabove offers the advantage that it responds quickly to changes in engine operating conditions and is capable of admirably coping with a transient condition of the engine, so that engine control can be achieved satisfactorily. However, one problem encountered by this system is that, when the throttle valve is actuated and brought to a position in which it is nearly fully open, a pulsation appears in engine torque, with a result that a surging occurs in engine speed and spoils riding comfort.

This phenomenon is accounted for by the fact that the map scanning system using the engine load $T_p$ has as a parameter the air intake $Q_A$ (or the subatmospheric pressure of air taken into the engine) as described hereinabove. The air intake $Q_A$ is susceptible to influences exerted by a pulsating stream of air taken into the engine when the throttle valve is nearly fully open. As a result, when the throttle valve is nearly fully open, the data $T_p$ representing the engine load shows a pulsation in spite of the load actually applied to the engine showing almost no change, and the coefficient of correction for the amount of injected fuel and the coefficient of correction for the ignition timing obtained by map scanning are also affected by the pulsation.

In terms of engine control, the pulsation affecting the coefficients of correction manifests itself as a fluctuation in the air/fuel ratio or in the ignition timing corresponding to the pulsation in suction, when the engine is operating under a constant load. These cause a change to occur in the torque developed by the engine, so that a surging occurs in the engine speed and spoils riding comfort as described hereinabove.

Figure 4:
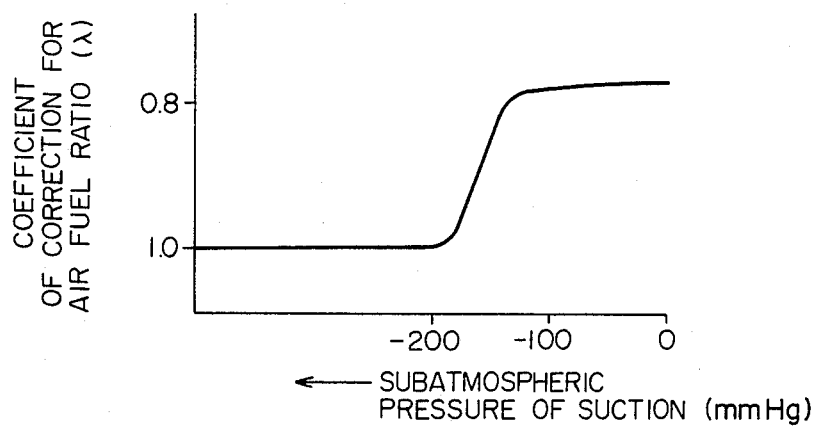
FIGS. 4 and 5 are diagrams showing characteristic curves in explanation of a problem encountered in the prior art.
Figure 5:
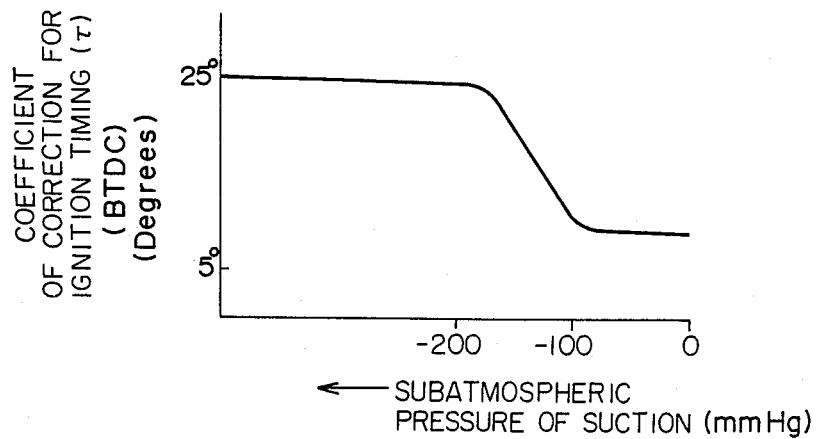

In view of the fact that, as shown in FIGS. 4 and 5, the coefficient of correction $\lambda$ for the air-fuel ratio and the coefficient of correction $\tau$ for the ignition timing show a great change at the subatmospheric pressure of the suction when the throttle valve is nearly fully open, this has great influence on engine performance.

According to the invention, means is provided for producing data by suppressing the rate of change of the data representing the engine load whereby the suppressed data can be used for scanning the map only when the engine is in a predetermined range of operating conditions. When the engine is in the predetermined range of operating conditions, suppressed data is used for performing map scanning. A preferred embodiment of the invention will no be described by referring to FIGS. 1, 2, 6 and 7.

In the embodiment shown, it's hardware is similar to that of the system of the prior art shown in FIG. 2, and the only difference between the invention and the prior art lies in the manner in which map scanning is performed by the control system 1 with no difference existing between them in other points of control.

The description will therefore be concerned hereinafter mainly with the map scanning performed in the control system.

Figure 1:
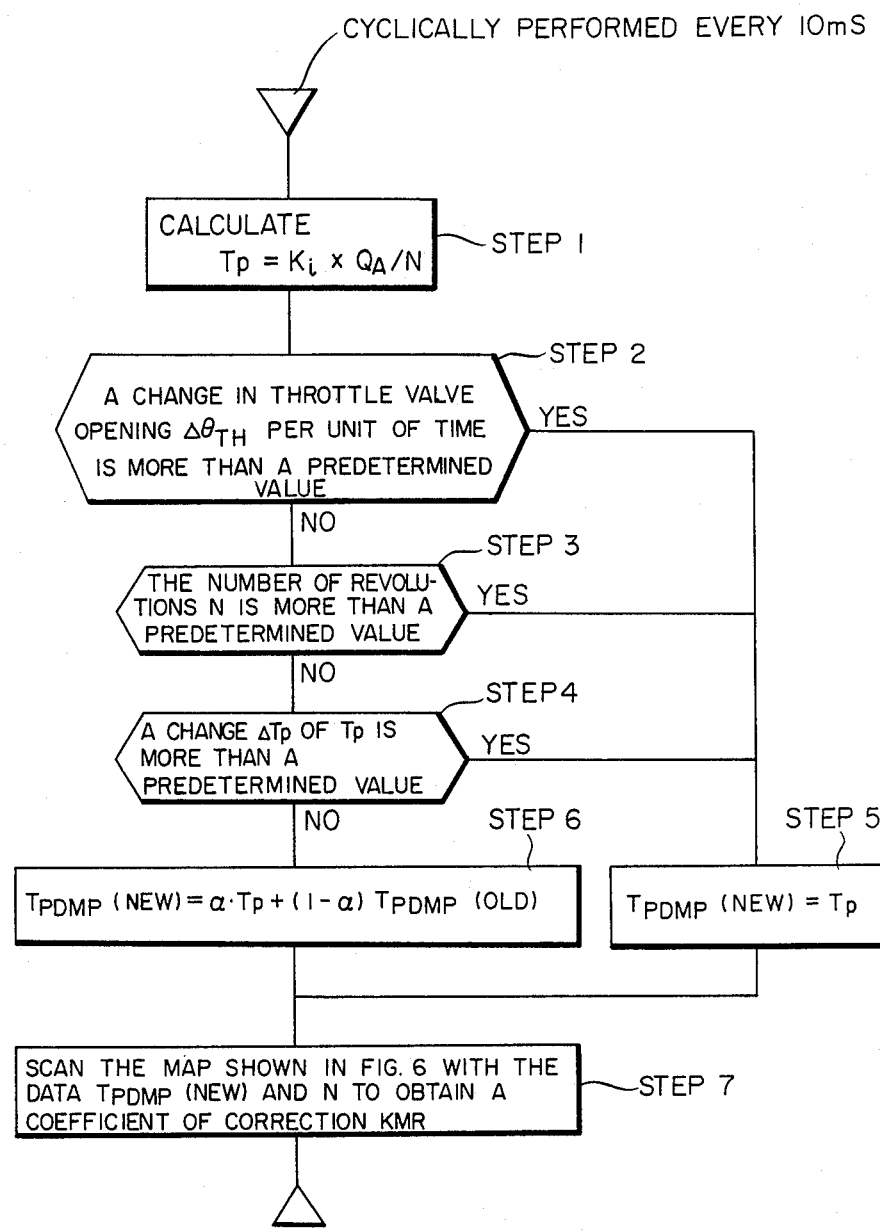
FIG. 1 is a flow chart of the operation of the engine control system comprising one embodiment of the invention.

FIG. 1 is a flow chart for performing map scanning in the embodiment of the control system 1 in conformity with the invention. Map scanning is repeatedly performed once every ten mS, for example.

In step 1, the air intake QA based on the air flow data AF from the air flow sensor 20 and the data N representing the number of revolutions are inputted to the control system 1 which does calculation based thereon to obtain data $T_p$.

In step 2, the opening data $\theta_{TH}$ from the throttle sensor 35 is examined to determine whether or not a change $\Delta\theta_{TH}$ in the opening data of the throttle valve 34 is more than a predetermined value. In step 3, the number of revolutions N is examined to determine whether or not it is more than a predetermined value. In step 4, it is determined whether or not a change $\Delta T_p$ in the engine load $T_p$ is more than a predetermined value.

The operation shifts to step 6 only when all the results obtained in steps 2-4 are all in the negative. However, when any one of the results obtained in steps 2-4 is in the affirmative, the operation shifts to step 5 with regard to all the items of data.

In steps 5 and 6, data $T_{PDMP}$ (an abbreviation of the damped value of $T_p$) for scanning a map is obtained. In step 5, the data $T_p$ obtained in step 1 is substituted as it is for $T_{PDMP}$. In step 6, data $T_{PDMP}$(new) is obtained by calculating, in a predetermined proportion, a weighted mean of the data $T_p$ and the data $T_{PDMP}$ (old) of the previous operations. The predetermined proportion may be $\alpha$: $1-\alpha$ or $\alpha = 1/64$, for example.

Figure 6:
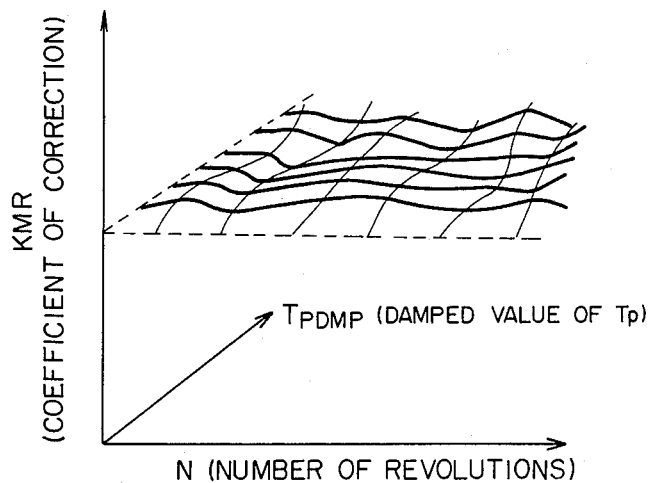
FIG. 6 is a view in explanation of the map used in the embodiment of the invention.
Figure 7:
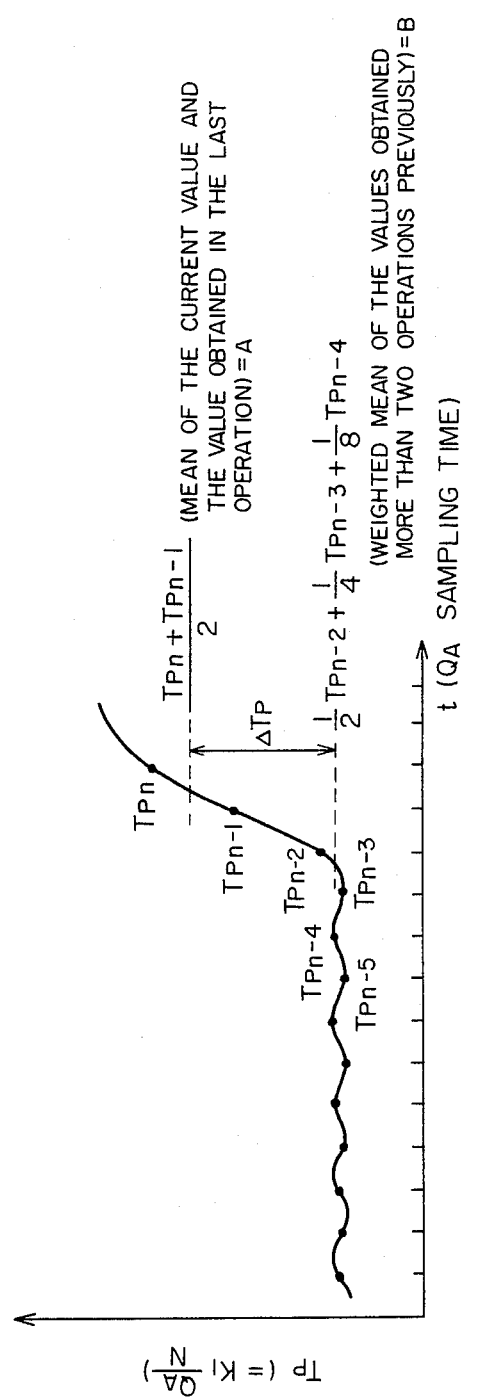
FIG. 7 is a view in explanation of the manner in which changes in data on the load applied to the engine are calculated in the present invention.

Then, the operation shifts to step 7 after step 5 or step 6 is followed. In step 7, a map shown in FIG. 6 is scanned by using the data $T_{PDMP}$ and N, to obtain a coefficient of correction KMR.

The difference in the results obtained in effecting control between the case in which the operation shifts from step 5 to step 7 and the case in which the operation shifts from step 6 to step 7 is as follows. In the former Case, the data $T_{PDMP}$ used for scanning the map is the engine load $T_p$ itself, so that map scanning is performed by using the engine load $T_p$ and the number of revolutions N to obtain a coefficient of correction KMR, as is the case with the control system of the prior art outlined hereinabove. Thus the fuel supply or the ignition timing or both of them are corrected.

In the latter case in which the operation shifts from step 6 to step 7, the map or portion of the data $T_{PDMP}$ (old) used for scanning the map previously with only a portion of the data $T_p$ newly inputted being substituted into the data $T_{PDMP}$, so that the rate of change of the data $T_p$ is greatly suppressed. When map scanning is performed by using the data $T_{PDMP}$ (new) in which the rate of change has been greatly suppressed, the appearance in the data $T_{PDMP}$ (new) of a change that is caused by a pulsation of a stream of air taken into the engine is avoided even if such change appears in the data $T_p$. Thus the coefficient of correction KMR obtained by performing map scanning by using the data $T_{PDMP}$ (new) is almost imprevious to the influence exerted by a pulsation of a stream of air taken into the engine. For example, when the proportion ($\alpha = 1/64$) referred to hereinabove is selected, the rate of change of the data $T_p$ can be suppressed to 1/64 by a simple arithmetic. Thus the influences exerted on engine performance by a pulsation of a stream of air taken into the engine can be avoided.

When the operation shifts from step 6 to step 7, a delay might occur in effecting engine control, although influences exerted by a pulsation of a stream of air taken into the engine can be avoided because the rate of change of the engine load $T_p$ is suppressed as described hereinabove.

To obviate this disadvantage, steps 2-4 are followed and step 6 is skipped in this embodiment when engine operating conditions are in a range in which a pulsation of a stream of air taken into the engine poses no serious problem and it is not desirable that the rate of change of the data $T_p$ be suppressed and a delay be caused to occur in effecting control of air flow and ignition timing. In this case, the data $T_p$ is substituted as it is for the data $T_{PDMP}$ in step 5.

Operating conditions of the engine in which step 6 is not followed based on the determinations made in steps 2-4 will be described.

In step 2, it is determined whether or not a change $\Delta \theta_{TH}$ in the throttle valve opening is more than a predetermined value. Thus, when the throttle valve is suddenly operated or when the engine is accelerated or decelerated suddenly, step 6 is not followed. As a result, it is possible to avoid a reduction in the respnsiveness of the engine and enables acceleration and deceleration to be satisfactorily achieved.

In step 3, a decision is made to skip step 6 when the number of revolutions N of the engine exceeds a predetermined value. Generally, a pulsation of a stream of air taken into the engine markedly affects engine performance when the number of revolutions is low and gives rise to no serious problem when the number of revolutions is high. Meanwhile the operation performed in step 6 leads to a reduction in the responsiveness of the engine control. Thus, by following step 3, it is possible to avoid an unnecessary reduction in the responsiveness of the engine control.

In step 4, it is determined whether or not the rate of change of the engine load $T_p$ has exceeded a predetermined value. When it is determined that the predetermined value is exceeded, step 6 is skipped to thereby enable a delay in effecting control to be avoided when the engine load actually undergoes a change. One example of the calculation done in step 4 to obtain a change $\Delta T_p$ in the data $T_p$ will now be described by referring to FIG. 7. When timing data $T_{pn}$ is inputted, the difference between a simple mean A ($A = \frac{1}{2}T_{pn} + \frac{1}{2}T_{pn-1}$) of the value of data $T_{pn}$ and the value of data $T_{pn-1}$ obtained in the operation immediately before the operation producing the data $T_{pn}$ and a weighted mean B ($B = \frac{1}{2}T_{pn-2} + \frac{1}{4}T_{pn-3} + \frac{1}{8}T_{pn-4} + \ldots$) of the values of data $T_{pn-2}$, $T_{pn-3}$, $T_{pn-4}$ . . . obtained in operations more than two operations before the operation producing the data $T_{pn}$, and the difference $A - B$ is used as a change $\Delta T_p$. Thus $\Delta T_p = A - B$.

In this example, it is possible to prevent the engine control system from misoperating when the data $T_p$ might undergo a change due to the introduction of a noise, for example.

From the foregoing description, it will be appreciated that the invention enables a fluctuation in the torque generated by the engine to be satisfactorily suppressed which might otherwise be caused to occur by a pulsation of a stream of air taken into the engine, without reducing the responsiveness of the control system to operating conditions of the engine. Thus the problem of the prior art that a reduction in riding comfort that might otherwise be caused by a surging of engine speed can be solved.

In the embodiment shown and described hereinabove, above, the engine load $T_p$ has been described as being calculated based on the air intake $Q_A$ and the data N representing the number of revolutions of the engine. However, the invention is not limited to this specific form of the embodiment and the engine load $T_p$ may also be calculated based on the opening of the throttle valve or the subatmospheric pressure of air taken into the engine.

What is claimed is:

1. In an engine contorl system of the type in which at least one engine control operation, including ignition timing and fuel supply, is controlled on the basis of data values obtained by scanning a memory map to access a respective data value using as parameters a first signal representing a number of revolutions of the engine and a second signal representing a value of engine load which is based at least in part on an instantaneous value of air flow rate to the engine, the improvement comprising:

filtering means for providing a third signal representing a value of engine load which is filtered to reduce the rate of change thereof;

means for replacing said second signal as a parameter by said third signal in accessing said memory map only when the engine is operating with a predetermined range of operating conditions; and means for generating an engine control singal on the basis of said second signal representing a value of engine load and a data value obtained from said memory map.

2. An engine control system according to claim 1, wherein said engine control operation being controlled is ignition timing and said data values are corection factors used by said generating means to generate an ignition timing signal.

3. An engine control system according to claim 1, wherein said engine control operation being controlled is fuel supply and said data values are correction factors used by said generating means to generate a fuel injection time signal.

4. An engine control system as claimed in claim 1, wherein the rate of change of a manipulated variable of a throttle valve, the number of revolutions of the engine and the rate of change of the engine load are all less than respective predetermined values in said predetermined range of operating conditions.

5. An engine control system according to claim 1, wherein said filtering means comprises processor means for periodically sampling said second signal representing values of engine load and for producing said third signal by calculating in a predetermined proportion a weighted mean of a value of a current sample of said second signal and the value of the preceding sample of said second signal.

6. An engine control system for controlling fuel supply to an internal combustion engine on the basis of a fuel injection time signal, comprising:

memory means for storing a map of correction factors which are accessible by scanning said map using as parameters a first value representing a number of revolutions of the engine and a second value representing engine load;

generating means for generating an engine load signal based at least in part on an instantaneous value of air flow rate to the engine;

filtering means responsive to said generating means for filtering said engine load signal to reduce the rate of change thereof, thereby producing a filtered engine load signal;

scanning means for scanning said map stored in said memory means to access a correction factor using said engine load signal generated by said generating means when the engine is operating outside of a predetermined range of operating conditions and using said filtered engine load signal produced by said filtering means when the engine is operating with said predetermined range of operating conditions; and means for generating a fuel injection time signal based on the engine load signal generated by said generating means and a correction factor accessed from said memory means by said scanning means.

7. An engine control system as claimed in claim 6, whrein the rate of change of a manipulated variable of a throttle valve, the number of revolutions of the engine and the rate of change of the engine load are all less than respective predetermined values in said predetermined range of operating conditions.

8. An engine control system for controlling fuel supply to an internal combustion engine on the basis of an ignition timing signal, comprising:

memory means for storing a map of correction factors which are accessible by scanning said map using as parameters a first value representing a number of revolutions of the engine and a second value representing engine load;

generating menas for generating an engine load signal based at least in part on an instantaneous value of air flow rate to the engine;

filtering means responsive to said generating means for filtering said engine load signal to reduce the rate of change thereof, thereby producing a filtered engine load signal;

scanning means for scanning said map stored in said memory means to access a correction factor using said engine load signal generated by said generating means when the engine is operating outside of a predetermined range of operating conditions and using said filtered engine load signal produced by said filtering means when the engine is operating within said predetermined range of operating conditions; and means for generating an ignition timing signal based on the engine load signal generated by said generating means and a correction factor accessed from said memory means by said scanning means.

9. An engine control system as claimed in claim 8, wherein the rate of change of a manipulated variable of a throttle valve, the number of revolutions of the engine and the rate of change of the engine load are all less than respective predetermined values in said predetermined range of operating conditions.

* * * * *